June 10, 1969   W. C. LEASURE ET AL   3,449,134
METHOD FOR PACKAGING IN DEOXYGENATED ENVIRONMENT
Filed June 30, 1965   Sheet 1 of 2

INVENTORS
WILLIAM C. LEASURE
JERRY W. CRAWFORD

BY *Larson and Taylor*

ATTORNEYS

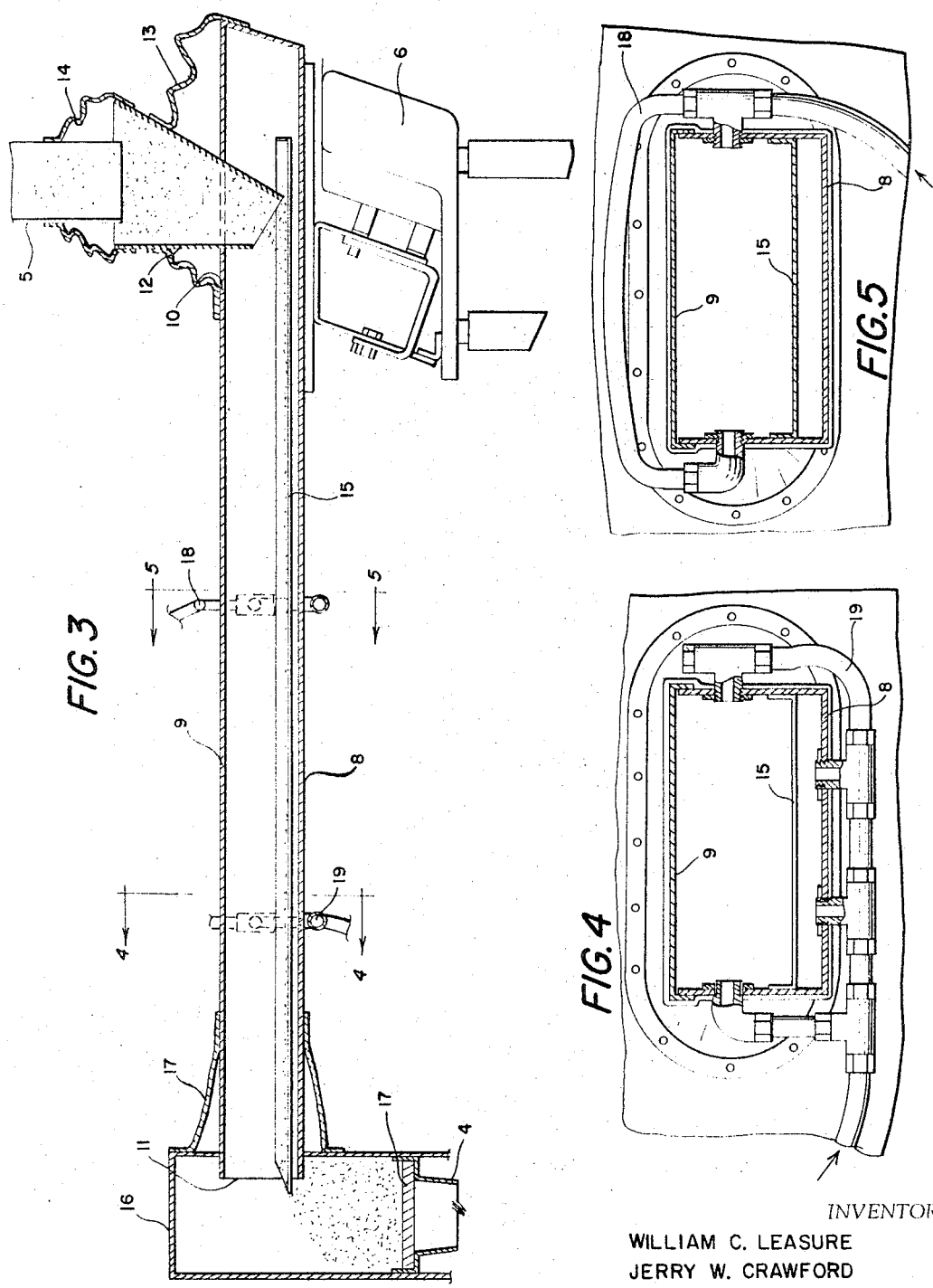

United States Patent Office 3,449,134
Patented June 10, 1969

3,449,134
METHOD FOR PACKAGING IN DEOXYGENATED ENVIRONMENT
William C. Leasure and Jerry W. Crawford, Houston, Tex., assignors to Mira-Pak Inc., Houston, Tex., a corporation
Filed June 30, 1965, Ser. No. 468,503
Int. Cl. B65b 31/02
U.S. Cl. 99—189       3 Claims

ABSTRACT OF THE DISCLOSURE

A method of packaging a granular product in a substantially oxygen free atmosphere wherein the product is fed through the feed tube into a chamber pressurized with an inert gas so that the inert gas passes upwardly through the feed tube to deoxygenate the product entering the pressurized chamber. The granular product is vibrated through the chamber on a vibrating conveyor and is cascaded off the end of the conveyor and passed through a closable opening into a package which may be at substantially atmospheric pressure.

---

Figure 2:
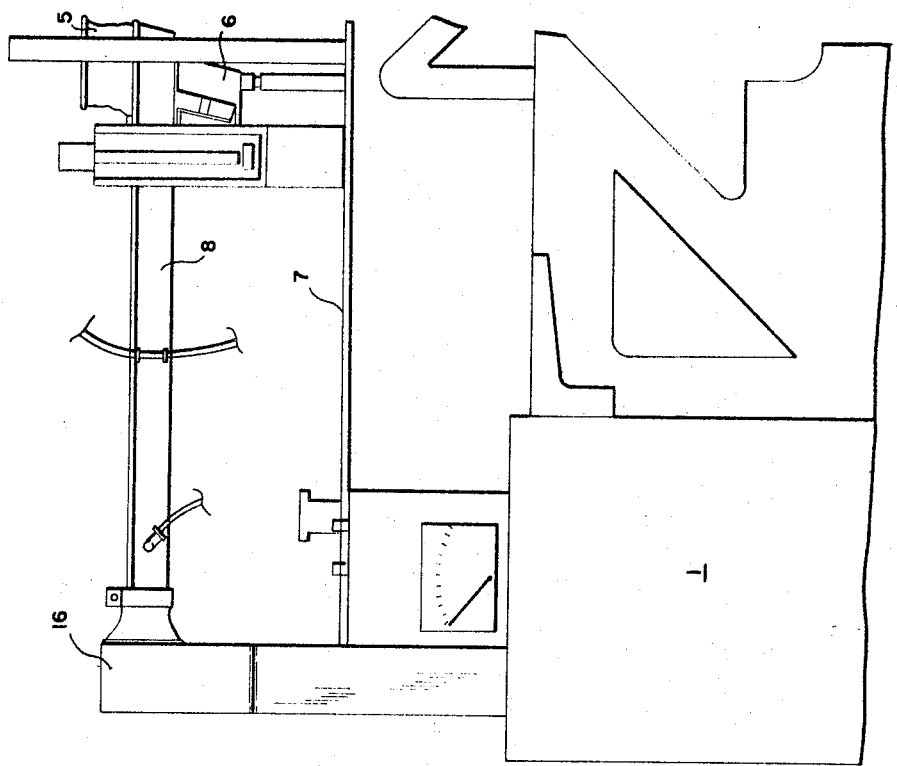

This invention relates to a method and apparatus for packaging products in an oxygen free atmosphere and more specifically to means for removing substantially the air from the environs of a product prior to placing the product in a package.

There are numerous products, food products particularly, which deteriorate in the presence of oxygen. Ground coffee, for example, is peculiarly susceptible to the effects of oxygen and is customarily stored in vacuum cans. It is exceedingly difficult, to remove all of the air from around the individual coffee particles and, hence, coffee packaged in vacuum cans has a limited shelf life. Powdered whole milk has not been packaged successfully because of its tendency to become rancid in the presence of oxygen. Powdered potatoes oxidize readily and present problems in packaging. While numerous bulk products such as cheese require packaging in a substantially oxygen free atmosphere, it is evident that the packaging of a granular or powdered product presents far more severe problems than those encountered with comparatively large bulk products.

There have been numerous methods utilized heretofore for deoxygenating products but none has proved entirely satisfactory. As previously pointed out vacuum packaging has been used extensively but it is not possible to completely deoxidize products by this method, particularly granular products such as coffee. Furthermore, vacuum packaging tends to draw off the aromatics of ground coffee.

Another method for deoxygenating products is to replace the oxygen in the package with an inert atmosphere. Such a method and apparatus is shown, for example, in Patent 3,090,174, issued May 21, 1963. The method and apparatus described in the aforementioned patent is particularly well suited for packaging single objects, such as blocks of cheese. However, such a method could not be effectively used with a granular product because of the difficulty in removing the air surrounding each of the product particles.

In Patent 2,830,911, issued Apr. 15, 1958, there is described a method for deoxygenating potato granules and the like wherein the product is "washed" with nitrogen gas before the product is packaged. The apparatus disclosed in this patent provides means for passing the product in counterflow relation to the inert gas with sections wherein the product particles are fluidized by the gas. Still another method and apparatus for packaging in an inert atmosphere is that disclosed in Patent 2,649,671 issued Aug. 25, 1953, wherein a chamber filled with inert gas surrounds the package while it is filled with the product. Both of the foregoing methods are effective but require equipment which is quite large and space consuming or is expensive.

The present invention provides an improved method and apparatus for packaging product in an inert atmosphere which is relatively inexpensive and readily adaptable to existing packaging machinery and yet which is effective in deoxygenating product for packaging.

A pressurized chamber is provided along the path of feed of the product and the product is subjected first to the inert gas passing through a mass of the product and subsequently the individual product particles are scrubbed with the inert gas so that the product as delivered to the package is substantially free of oxygen. More specifically, according to the present invention a vibrating feed tray, which serves the function of delivering product to a form and fill packaging machine, is enclosed and inert gas is fed thereto to form a pressurized chamber. Product fed into one end of the feed tray blocks the opening to the feed tray and the inert gas passing through the mass of product clears the product of a large portion of the oxygen. Subsequently as the individual product particles are vibrated along the feed tray each particle is scrubbed with the inert gas and substantially all of the air is driven off. As the product is cascaded over the end of the feeder tray preparatory to delivery to a package, a further final cleaning is effected to remove any few remaining oxygen bearing pockets in the product.

It has been found unnecessary according to the present invention to perform the actual packaging operation in an inert chamber. The empty package is formed in a manner well known in the art and the measured quantity of the product is fed into the package, the product carrying with it a surrounding atmosphere of inert gas. The movement of the product into the empty package forces out the air in the package so that when the package is sealed the product is encased completely in an inert atmosphere.

An object of the present invention is to provide a method and apparatus for packaging product in a deoxygenated atmosphere which method is particularly well suited for packaging granular product such as coffee, powdered potatoes, or powdered whole milk.

Another object of the present invention is to provide a method and apparatus for packaging product in an inert atmosphere wherein the product is passed through a pressurized chamber filled with an inert gas and the product in bulk form provides a closure for one end of this chamber.

Figure 1:
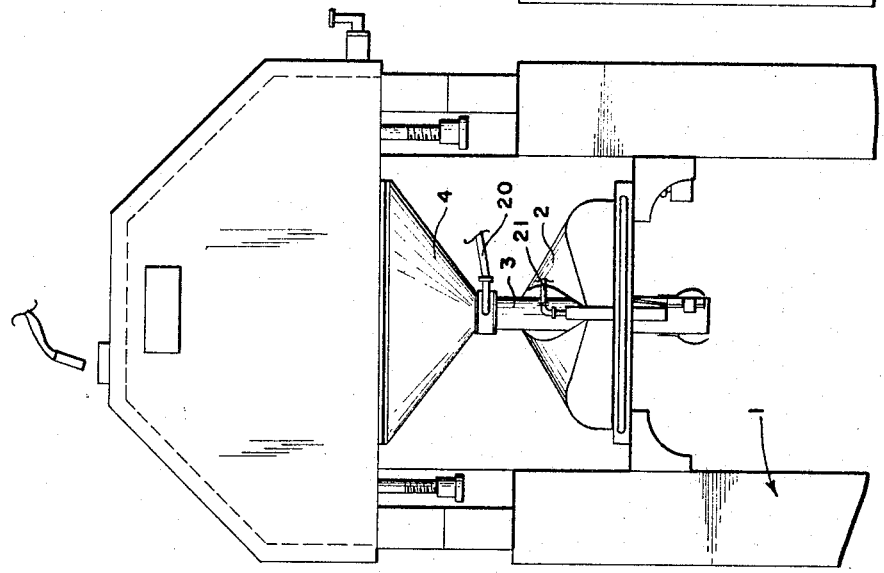

Other objects and many of the attendant advantages of the present invention will become more readily apparent upon consideration of the following detailed specification in connection with the accompanying drawings wherein:

FIG. 1 is a front elevational view of a form and fill packaging machine with the apparatus for deoxygenating the product applied thereto, FIG. 2 is a side elevational view of the apparatus shown in FIG. 1, FIG. 3 is a longitudinal sectional view showing the details of construction of the deoxygenating apparatus, FIG. 4 is a sectional view along the line 4—4 of FIG. 3, and FIG. 5 is a sectional view along the line 5—5 of FIG. 3.

Referring now more specifically to the drawings wherein like numerals indicate like parts throughout the several views there is shown in FIG. 1 the frame 1 of a form and fill packaging machine. Mounted on this frame is a former 2 which shapes strip packaging material into tubular form. This former may be constructed in a manner similar to that shown in Patent 2,899,875 issued Aug. 18, 1959.

The packaging machine is provided with a pair of sealing jaws (not shown) which forms the top and bottom of a package and draws the packaging film over the former. This mechanism is conventional and may be similar to that shown in the patent to Zwoyer 1,986,422 issued Jan. 1, 1935. The product is normally weighed or measured volumetrically and delivered through the open upper end of the former to the empty package. The product is fed to the package through a delivery tube 3 which as shown in FIG. 1 extends downwardly into the open upper end of the former. The upper end of tube 3 is connected to the lower end of a funnel shaped delivery chute 4.

With reference to FIG. 2 the lower end of a feed tube 5 is shown. The upper end of this tube would be connected with the conveyor system in the plant delivering product to the feed tube. A vibrator 6 is mounted on support bracket 7 and secured to the operating arms of the vibrator 6 is a vibratory feeder tray 8. The structure of the feeder tray 8 is shown more clearly in FIG. 3 wherein it can be seen that the tray is provided with a cover 9 which completely encloses the tray except for an opening 10 on the top adjacent one end of the tray and an open end 11. The opening 10 receives a funnel 12 disposed adjacent the lower end of feed tube 5 and the tube 5 and funnel 12 are attached to the feeder tray and to each other in gas tight relation by means of a flexible gas impervious casing 13 and 14. Mounted on the feeder tray 8 in spaced relation to the bottom thereof is a platform 15 and this platform may, if desired, be perforate.

The open end 11 of the feeder tray 8 fits within a header structure 16 and is secured therein in gas tight relation by means of a flexible gas impervious casing 17. The lower end of the header 16 is fitted into the the upper end of the funnel 4 and a slidable closure 17 permits communication between the header 16 and funnel 4 so that a measured quantity of product may be delivered to the funnel. If a predetermined volume of product is to be delivered any well known volumetric measuring means may be disposed within header 16. For example, closure 17 may be provided with cups having open bottoms so that when a cup is filled with product it is moved over the opening in the upper end of funnel 4 so as to deliver the desired quantity of product into the empty package. If a weighing system is utilized the weighing pan may be mounted within the header 16. The bottom of the header remains closed except when product is actually being delivered into a package. The header and enclosed feeder tray provide a chamber which is closed except for the opening through the feed pipe 5 and this pipe is normally blocked with product.

There is provided means for supplying an inert gas to the volume enclosed by the feeder tray. This means comprises pipes 18 and 19 which may be connected with a suitable source of gas through a valve and which open into the chamber enclosed by the feeder tray both above and below the partition 15 as clearly shown in FIGS. 4 and 5. With reference to FIG. 1 it can be seen that there is provided a gas connection 20 at the lower end of funnel 4 and a gas connection 21 which extends through the open upper end of former 2 and into the upper end of the package being formed. It has been found, however, that gas connections 20 and 21 are not essential to the successful operation of the system and that product may be packaged in a deoxygenated atmosphere utilizing only connections 18 and 19.

The method and apparatus disclosed operates as follows: Product to be packaged is fed through the feed pipe 5. This product may be in a granular or powdered form so that it substantially blocks the opening through the feed pipe. An inert gas is fed to the gas connections so that inert gas fills the chamber formed by the header 16 and the enclosed feeder tray 8. Since the only opening to the chamber is blocked by product, the inert gas passes up through the feed pipe, deoxygenating the product to a substantial degree. A portion of the inert gas does escape through the feed pipe but pressure builds up within the chamber thus preventing the entry into the chamber of air at atmospheric pressure. The vibrator 6 causes the feed tray to vibrate and move the product from the feed pipe to the discharge opening 11. As the individual product particles are moved along the platform 15, they are rotated and, in effect, scrubbed by the inert gas. In this manner any oxygen pockets remaining between individual particles after treatment in the feed pipe are eliminated. The platform 15 may be perforate to permit the inert gas to pass upwardly from beneath the platform to effect an additional cleaning but it is not essential that the platform be perforate. As the product particles reach the end of platform 15, they cascade to the lower end of header 16 and this particle movement through the inert gas provides a third gas treatment. The product is measured volumetrically or by weight within the header 16 and the appropriate quantity of product is delivered through the closure 17 and funnel 4 and into a package formed by the packaging machine 1. The movement of the product surrounded by inert gas into the package forces any air in the package outwardly so that when the top seal is formed the product is encased in a substantially oxygen free atmosphere. It is apparent that when the operation of the system is started the chamber will be filled with oxygen and it may require several minutes operation before the product is sufficiently deoxygenated to package effectively.

In one specific embodiment of the present invention sweet potato flakes were packaged in 5 oz. bags at a rate of approximately 50 per minute. The oxygen content of the packages was found to be less than .9% when using nitrogen fed to the supply pipes at a rate of approximately 300 cubic feet per hour.

It is important according to the present invention to maintain a pressurized chamber within which to treat the product. If the product is of such nature that it cannot block the feed pipe 5 effectively, it is possible to provide a gate to close off that end of the treatment chamber and admit product at selected time intervals. When the gate is opened the outflow of inert gas will deoxygenate the product entering the chamber and prevent the entry of any gases at atmospheric pressure. Thus this accomplishes the same result as the counter-flowing inert gas through the product in the feed pipe in the disclosed embodiment.

The precise nature of the packaging machine forms no essential part of the present invention. For the sake of illustration only reference has been made to certain prior art patents but it is obvious that the presently disclosed method and apparatus could be readily adapted to many diverse types of packaging machines.

Obviously many modifications and variations of the present invention are possible in light of the above teachings. What is claimed as new and is desired to be secured by Letters Patent is:

1. A method of packaging a granular product comprising feeding the product in bulk form through a feed opening into a chamber pressurized with an inert gas, the product substantially closing the feed opening and the inert gas passing from the chamber through the said product located in the feed opening to effect a first deoxygenating step, vibrating the product through the pressurized chamber to scrub the individual product particles with inert gas to effect a second deoxygenating step and subsequently passing the granular product out of the chamber and into a package, the interior of the package being at a pressure equal at least to atmospheric pressure, the step of passing the granular product being conducted such that the movement of the granular product into the package forces out the gases previously contained therein, thereby providing a package substantially free of said gases previously contained therein.

2. A method of packaging a granular product in a deoxygenated atmosphere comprising the steps of providing a pressure chamber with a feed passageway at one end thereof, filling the feed passageway with the granular product to substantially close the chamber, supplying an inert gas under pressure to the chamber whereby the gas fills the chamber and passes from the chamber through the product in the feed passageway, vibrating the product through the chamber to clean the individual product particles of oxygen and delivering a predetermined quantity of product through a dispensing opening in the chamber into a package, the interior of the package being at a pressure equal at least to atmospheric pressure, the step of delivering the granular product being conducted such that the movement of the granular product into the package forces out the gases previously contained therein, thereby providing a package substantially free of said gases previously contained therein.

3. A method of packaging a granular product in a deoxygenated atmosphere comprising the steps of providing a pressure chamber with a feed passageway at one end thereof, filling the feed passageway with the granular product to substantially close the chamber, supplying an inert gas under pressure to the chamber whereby the gas fills and pressurizes the chamber and passes from the chamber through the product in the feed passageway to deoxygenate the product in the feed passageway as a first gas treatment, vibrating the product through the pressurized chamber to clean the individual product particles of oxygen as a second gas treatment and cascading the product particles through the inert gas as a third gas treatment and delivering a substantially oxygen free product from the pressurized chamber to a package, the interior of the package being at a pressure equal at least to atmospheric pressure, the step of delivering the granular product being conducted such that the movement of the granular product into the package forces out the gases previously contained therein, thereby providing a package substantially free of said gases previously contained therein.

References Cited
UNITED STATES PATENTS

| | | | |
|---|---|---|---|
| 2,062,109 | 11/1936 | Rogers | 99—68 |
| 2,195,740 | 4/1940 | Salfisberg | 93—3 |
| 3,077,405 | 2/1963 | Clinton et al. | 99—71 |
| 3,151,955 | 10/1964 | Fleissner | 34—164 |
| 3,166,383 | 1/1965 | Morris | 34—164 |

A. LOUIS MONACELL, *Primary Examiner.*

S. B. DAVIS, *Assistant Examiner.*

U.S. Cl. X.R.

53—22